US011392935B2

United States Patent
Suresh et al.

(10) Patent No.: US 11,392,935 B2
(45) Date of Patent: Jul. 19, 2022

(54) AUTOMATIC ACTIVATION OF A PHYSICAL PAYMENT CARD

(71) Applicant: Apple Inc., Cupertino, CA (US)

(72) Inventors: Akila Suresh, San Jose, CA (US); Jarad M. Fisher, Millbrae, CA (US); David Harbige, London (GB); Richard Heard, San Francisco, CA (US); Ashish Nagre, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/944,885

(22) Filed: Jul. 31, 2020

(65) Prior Publication Data

US 2021/0042733 A1 Feb. 11, 2021

Related U.S. Application Data

(60) Provisional application No. 62/882,917, filed on Aug. 5, 2019.

(51) Int. Cl.
| | |
|---|---|
| *G06Q 20/34* | (2012.01) |
| *G06Q 20/32* | (2012.01) |
| *G06Q 40/02* | (2012.01) |
| *G06Q 30/00* | (2012.01) |
| *G06Q 20/10* | (2012.01) |
| *G06K 7/10* | (2006.01) |
| *G06Q 50/26* | (2012.01) |

(52) U.S. Cl.
CPC ....... *G06Q 20/354* (2013.01); *G06K 7/10297* (2013.01); *G06Q 20/105* (2013.01); *G06Q 20/3263* (2020.05); *G06Q 20/352* (2013.01); *G06Q 30/0185* (2013.01); *G06Q 40/02* (2013.01); *G06Q 50/265* (2013.01)

(58) Field of Classification Search
CPC ............. G06Q 20/354; G06Q 20/3263; G06Q 20/105; G06Q 20/352; G06Q 30/0185; G06Q 40/02; G06K 7/10297
USPC .......................................................... 705/35
See application file for complete search history.

(56) References Cited

U.S. PATENT DOCUMENTS

| | | | | |
|---|---|---|---|---|
| 6,298,336 | B1 * | 10/2001 | Davis | G06Q 20/3558 705/41 |
| 9,411,981 | B2 * | 8/2016 | Eichholz | G06Q 20/354 |
| 10,134,087 | B1 * | 11/2018 | Geller | G06Q 40/00 |
| 10,262,319 | B1 * | 4/2019 | Benkreira | G08B 25/08 |

(Continued)

OTHER PUBLICATIONS

"Biometric Access Control using Near Field Communication and Smart Phones," by Mohammad Omar Derawi; Simon McCallum; Heiko Witte and Patrick Bours. 2012 5th IAPR International Conference on Biometrics (ICB). pp. 490-497. (Year: 2012).*

*Primary Examiner* — Sara C Hamilton
(74) *Attorney, Agent, or Firm* — Kilpatrick Townsend & Stockton, LLP (57) ABSTRACT

The present technology provides a convenient and secure technology for activating a physical card. For example, a when a physical card is created and send to a user associated with a user account, information pertaining to the physical card, including its activation code can be stored in association with the user account. When the card is received by the user, the user can use a portable computing device to read the card, and the portable computing device can then automatically activate the card using information encoded within the card.

20 Claims, 4 Drawing Sheets

(56) References Cited

U.S. PATENT DOCUMENTS

| | | | | |
|---|---|---|---|---|
| 10,685,347 | B1* | 6/2020 | Edwards | G06F 21/36 |
| 2002/0117541 | A1* | 8/2002 | Biggar | G06Q 30/04 |
| | | | | 235/379 |
| 2010/0155470 | A1* | 6/2010 | Woronec | G07F 7/08 |
| | | | | 235/380 |
| 2016/0364938 | A1* | 12/2016 | Miranda | G06K 19/07345 |
| 2018/0189527 | A1* | 7/2018 | Kim | G06K 7/10297 |
| 2020/0034825 | A1* | 1/2020 | Levy | G06Q 20/354 |
| 2020/0311715 | A1* | 10/2020 | Heidari | G06Q 20/354 |

\* cited by examiner

AUTOMATIC ACTIVATION OF A PHYSICAL PAYMENT CARD

CROSS REFERENCE TO RELATED APPLICATIONS

This application claims the benefit of and/or priority to U.S. provisional application No. 62/882,917, filed on Aug. 5, 2019, which is expressly incorporated by reference herein in its entirety.

TECHNICAL FIELD

The present technology pertains to a technology for activating a payment card, and more specifically pertains to automatically activating a physical payment card using a wallet application.

BACKGROUND

Payment cards that are delivered by mail are commonly not activated. They need to be activated by a card holder when they receive their new card. Often the card is activated by calling a phone number or accessing a website and then answering some questions about the user.

However, for users whose personal information has been stolen by hackers on the Internet, or other means, this mechanism of activating a card has risk in that anyone who has access to the physical card might know the necessary information to activate the card and then misappropriate it.

Additionally, it can be a nuisance for some users to go through the steps required to activate the physical card.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As used herein, reference to actions taken in real time or substantially real time refer to actions that take place as soon as practicable. It should be appreciated that some actions or results that are described as occurring in real time or substantially real time are inherently delayed by processing of certain steps or data, or electronic communications. However, reference to actions or results occurring in real time or substantially real time distinguish or are different from events that occur periodically, and especially different than events that occur in periods of more than one day.

Current methods of activating a payment card are both cumbersome and include the risk of a payment card being activated by an unauthorized party and misappropriated. Payment cards that are delivered by mail are commonly need to be activated by a card holder when they receive their new card. Often the card is activated by calling a phone number or accessing a website and then answering some questions about the user. However, for users whose personal information has been stolen by hackers on the Internet, or other means, this mechanism of activating a card has risk in that anyone who has access to the physical card might know the necessary information to activate the card and then misappropriate it. Additionally, it can be a nuisance for some users to go through the steps required to activate the physical card. The present technology solves both of these problems.

For example, the payment card of the present technology need only be read by a portable computing device that is associated with a valid user account that is matched to the payment card. No other interaction is needed by the user of the portable computing device/card holder. Thus, the present technology provides a better user experience because merely tapping the payment card with the portable computing device is a simple interaction that avoids the inconvenience of dialing a number, being put on hold, typing the number of the payment card into the same phone the user is trying to talk through, etc.

Perhaps more importantly, the present technology provides a more secure method for activating the payment card since activating the payment card requires uses of a portable computing device that itself requirement multiple layers of authentication to access (e.g., a first password or biometrics to unlock the portable computing device, plus a user account and second password to access a portable computing wallet account). Additionally the present technology also provides a more secure method for activating the payment card because it is less likely that a bad actor can obtain both a payment card and a device associated with the user account that it is possible for a bad actor to learn personal details on the dark web or through phishing scams. Finally, the present technology provides additional security to the card activation process by relying on information embedded into the electronics stored on the payment card, where such information is not displayed on the payment card or packaging.

While descriptions herein focus on payment card activation, it will be appreciated that the card can be any type of card or key that needs to be activated or authenticated prior to use. For example, the card can be an employee ID, a key card to a building or vehicle, a token for authenticating identity or providing codes for encrypting communications, or even a physical device for transferring a digital entity.

As described herein, one aspect of the present technology is the gathering and use of data available from various sources to provide automatic payment card activation. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide automatic payment card activations.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of customized payment options on financial statements, the present technology can be configured to allow users to select to "opt-in" or "opt out" of participation in the collection of personal information data during registration for services or anytime thereafter. In addition to providing "opt-in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, providing automatic payment card activation can be handled based on non-personal information data or a bare minimum amount of personal information, such as the content being requested by the device associated with a user, other non-personal information available to the financial statement server, or publicly available information.

Figure 1:
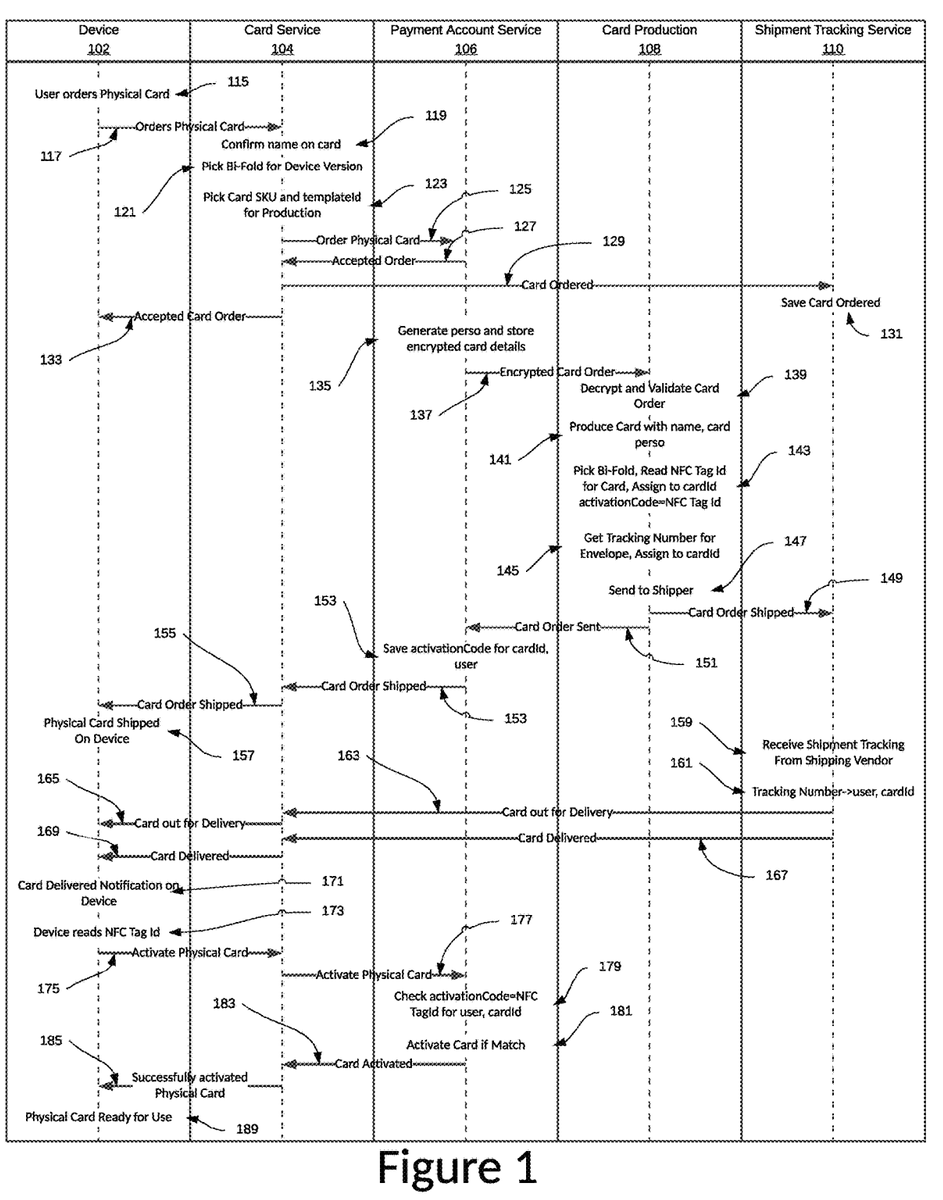
FIG. 1 illustrates a swim lane diagram showing example communications between, and example actions by, the represented entities for the purpose of automatically activating a payment card in accordance with some aspects of the present technology.

FIG. 1 illustrates the entities involved in the ordering, shipping, and activation of a physical card. The entities illustrated in FIG. 1 share communications and information before a card is shipped to build security features into the activation of the physical card in accordance with the present technology.

FIG. 1 illustrates communications among portable computing device 102, which has a digital wallet operating thereon, and several services involved in the ordering, shipping, and seamlessly activating a new physical payment card. Card service 104 can be a cloud-based service that facilitates the utilization of a digital version of the payment card used in NFC transactions. Card service 104 is also responsible for the management of the digital version of the payment card and for notifying the digital wallet on device 102 of transactions involving the digital or physical payment card. A payment card can be a credit card linked to a credit account or a cash card linked to a cash-based account (e.g. a checking or savings account).

Payment account service 106 can be a service provided by a bank that processes the financial transactions of the payment card.

Card production 108 represents both a server for receiving an order for a new payment card and also physical aspects of the facility for producing a new payment card.

Shipment tracking service 110 represents a server for receiving and sending information regarding a package including the new payment card, and for tracking the location and progress of shipment of the package including the new payment card.

As illustrated in FIG. 1 a user can indicate that they wish to order 115 a physical card for use with a payment account by interacting with device 102. Device 102 can then send a communication 117 indicating that the user wishes to order a physical card to card service 104. Card service can confirm 119 the name associated with the user that should be represented on the card and pick a bifold 121 that corresponds with the version of device 102. The bifold can be a folded card holder envelope that includes instructions to activate the card. As such, the bifold needs to be selected that provides the appropriate instructions to activate the card for the device that was used to order the card.

Different device versions interact with payment cards in different ways. For example, some devices 102 can have the ability to detect the presence of the payment card, whereas other devices 102 may need to be told to turn on their NFC antennae to communicate with the payment card. The bifold provides appropriate instructions for the particular version of device 102.

Card service 104 can further pick 123 a card SKU and a template ID for the card. Then card service 104 can order the physical card by sending a notification 125 to payment account service 106.

Payment account service 106 can receive notification 125 ordering the physical card and can reply with a message 127 indicating that the order is accepted.

Card service 104 and then send a notification 129 indicating that a card has been ordered to shipment tracking service 110. Notification 129 indicating that a card has been ordered can include information about the user and an order ID. Shipment tracking service 110 can save 131 card order information for shipment once the card has been created.

Card service 104 can also send a notification 133 to device 102 indicating that the card order has been accepted.

Payment account service 106 can generate card personalization (perso) details such as the user's name and other information to be printed on the card and stored on the machine-readable portions of the card, and store 135 encrypted card details and can then send an encrypted card order 137 to card production 108. The encrypted card order 137 can include the order ID, the template ID, the name of the user, the address of the user, and any other card personalization. After receiving the encrypted card order 137, card production 108 can decrypt and validate the card order communication 139 and produce the card 141 having the cardholder's name and any other card personalization. Card production 108 can further pick a bifold (based on the version of device 102), read the NFC tag ID for the card, and assign and record the activation code associated with card ID 143.

When the card has been produced, card production 108 can get a tracking number 145 for the card shipment package and record it in association with the card ID, and can send the package to the shipper 147.

When shipment tracking service 110 receives the package the user can be notified 149 that the card order has been shipped. And card production 108 can notify 151 payment account service 106 that the card order has been sent. The notification 151, which indicates that the card order has been sent, can also include the card ID, the NFC tag ID, the activation code, and the tracking number for the shipment package, and all of this data can be saved 153 in associated with user account information by the payment account service 106 for later use in activating the payment card.

Payment account service 106 can further notify card service 104 that the card order has been shipped 153, and the card service can forward that notification 155 to device 102. When device 102 receives notification 155 that the card order has shipped it can present a message 157 on its display informing the user that the card has shipped. In some embodiments, device 102 can store information indicating that a new payment card is expected.

While the shipment package containing the card is in transit, shipment tracking service 110 can receive the shipment tracking information 159 and can update tracking information based on the tracking number 161. When the shipment tracking information indicates that the card is out for delivery, shipment tracking service 110 can send a notification 163 to card service 104 indicating that the card is out for delivery. Notification 163 can include information about the user, the card ID, and the tracking number.

Card service 104 can further send a notification 165 notifying device 102 that the card is out for delivery. Similarly, when the card has been delivered, shipment tracking service 110 can send notification 167 including information about the user, the card ID, and tracking number to card service 104 indicating that the card has been delivered. Then card service 104 can send a similar notification 169 to device 102. Upon receiving the card delivered notification 169, device 102 can present 171 the notification on the display of device 102 informing the cardholder that the card is been delivered. In some embodiments, device 102 can store the information that the card has arrived.

In some embodiments, when the cardholder desires to activate the physical card, the cardholder need only present the physical card to portable computing device 102. Mobile device 102 can read the NFC tag ID 173. While reading 173 the NFC card the portable computing device can read the card's ID and the NFC ID along with the electronic address indicating where communications should be sent in order to activate the physical card. Device 102 can send a request 175 to activate the physical card to the electronic address at card service 104.

In some embodiments a card cannot be activated before card service 104 or device 102 has received a notification that the card has been delivered. For example, card service 104 can check to determine whether a card is expected or was delivered before sending request 175. In some embodiments, card service 104 can determine that the card is not activated, prior to sending the request 175, based in part of the stored information that the payment card was shipped or received.

The request 175 can include a user identifier, a device identifier or model description, the card ID, and the NFC tag ID and this information can be communicated in a message 177 from card service 104 to payment account service 106. Payment account service 106 can check 179 the information communicated in 177 against the information saved at step 153 to determine whether the appropriate activation code for the physical card was included, and to ensure the payment card is being activated by a device associated with the user account that was approved to receive the payment card. In some embodiments, the activation code is the NFC tag ID associated with the particular user and the card ID.

When all of the information matches the information saved at step 153 the card can be activated 181. Payment account service 106 can send a notification 183 to card service 104 informing it of the card activation. Card service 104 can in turn send a notification 185 to device 102 informing the wallet application on device 102 that the physical card is ready for use 189, which can cause a message to be displayed to the card holder on device 102.

The combination of factors including that payment account service 106 is aware of the card ID, the NFC tag ID, and a user ID collectively can make the activation of the payment card more secure than traditional methods. This is especially true since none of the information required was printed on the payment card, and the codes required to activate the card are not known to any person.

In some embodiments, aspects of the present technology including shipping notifications can be used by the rest of the entities in the system to be expecting a card activation such that card activation is only possible after the card has shipped, and may only be eligible for activation for a limited time after the card was delivered.

While the present technology was described in the context of NFC communication between a portable computing device and a physical payment card, it will be appreciated that other communication mechanisms could be substituted and still achieve the benefits of the present technology. For example, some portable computing devices might not have NFC capabilities, but most do have a camera. In such instances, the payment card could be printed with an optical pattern that encodes analogous information to that stored in the memory of the payment card described herein. Alternatively, the payment card could include an LED or other optical source capable of being activated in a pattern that is sufficient to transfer encoded information to the personal computing device utilizing a camera.

Figure 2A:
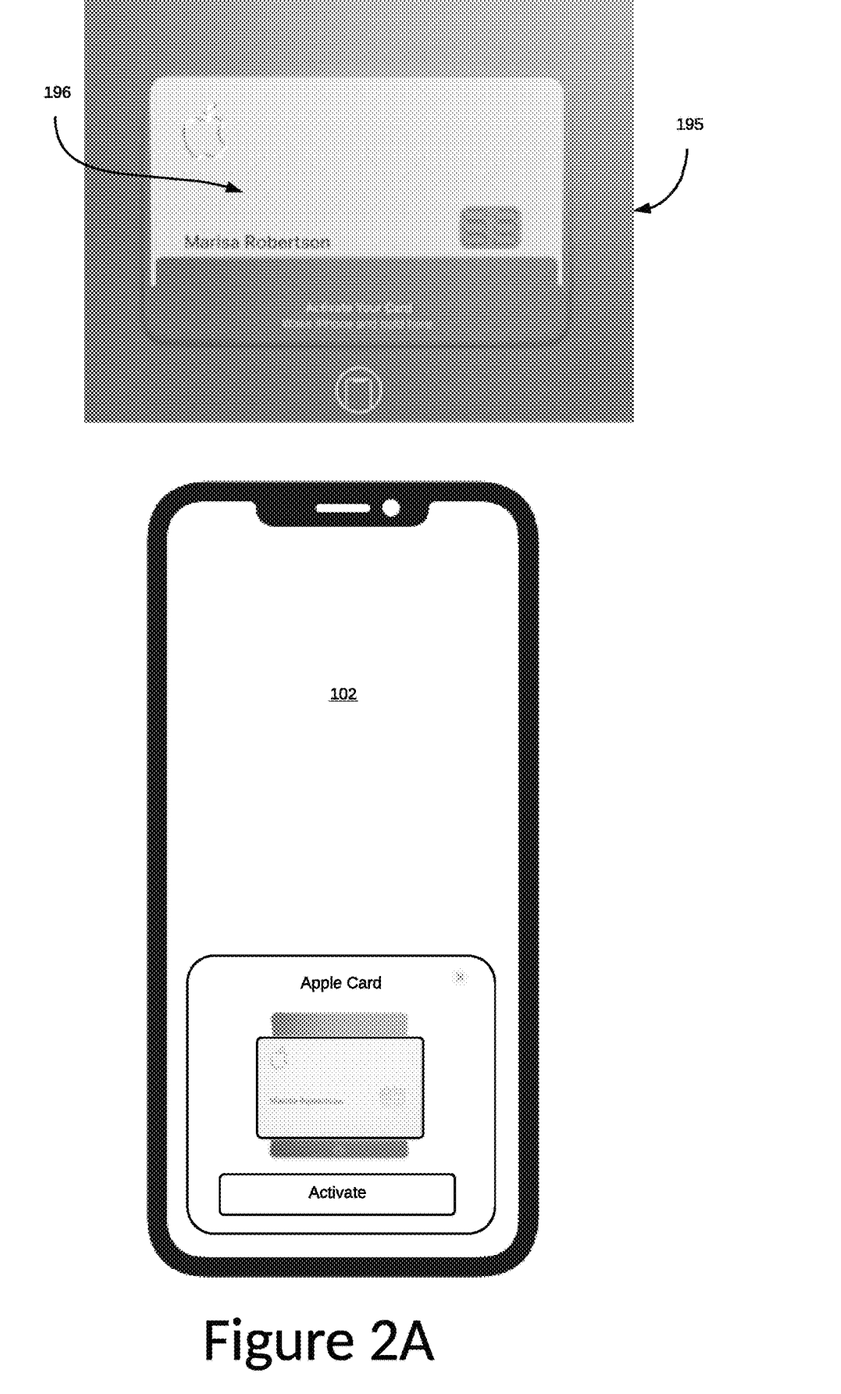
FIGS. 2A and 2B illustrates aspects of activating a card in accordance with some aspects of the present technology.
Figure 2B:
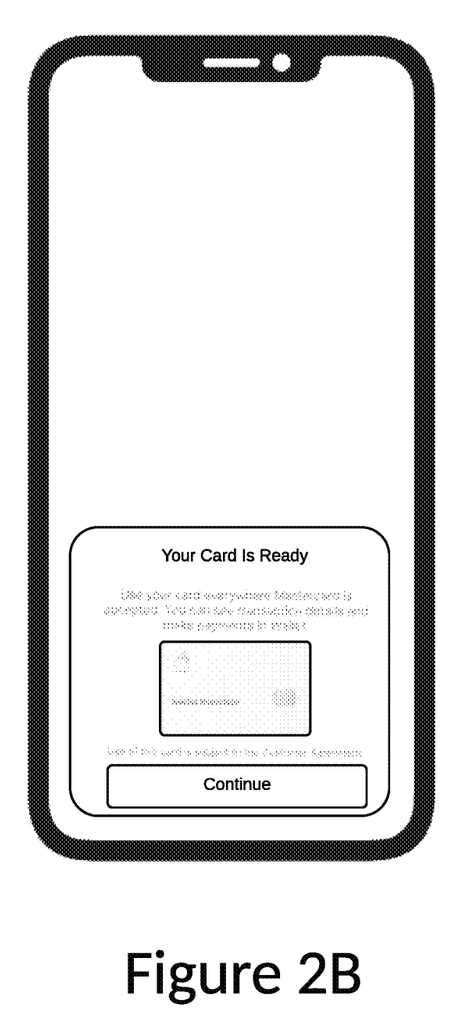

FIG. 2A and FIG. 2B illustrate aspects of the physical card activation by portable computing device 102. As illustrated in FIG. 2A a portion of bifold 195 provides instructions to hold the portable computing device 102 close to the payment card 196. In response to portable computing device 102 detecting the presence of payment card 196, portable computing device 102 read (173) payment card 196. Portable computing device 102 can also provide a graphical user interface, as illustrated in FIG. 2A, providing a selectable software button to initiate activation of payment card 196. In response to receiving an input via the selectable software button, portable computing device 102 can send the request (175) to activate the physical card.

One physical payment card 196 has been activated, portable computing device 102 can display (189) a message indicating that the card is ready for use.

Figure 3:
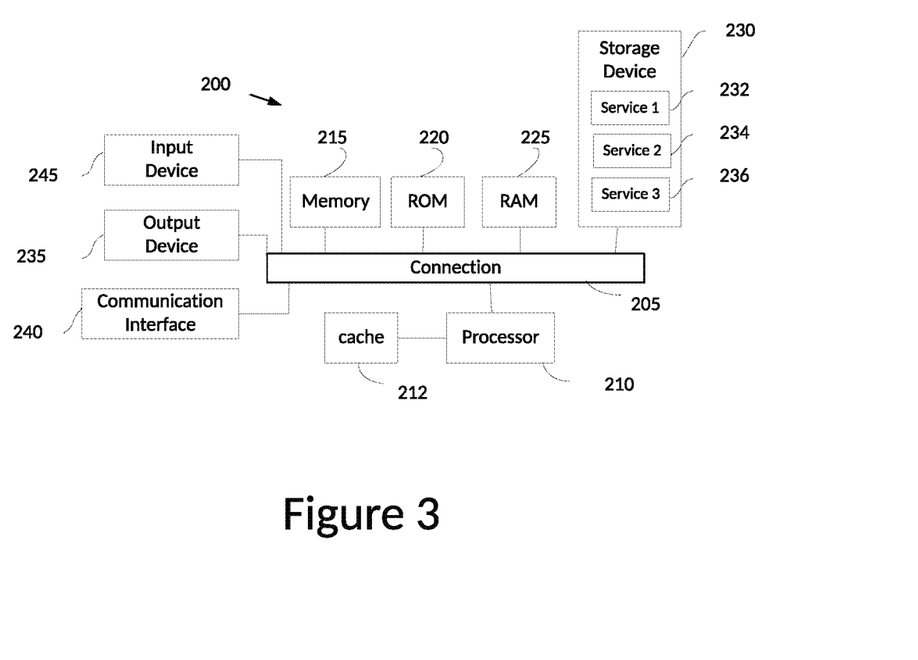
FIG. 3 illustrates an example computing system environment for use with the present technology.

FIG. 3 shows an example of computing system 200, which can be for example any computing device making anyone of the entities or services illustrated in FIG. 1, or any component thereof in which the components of the system are in communication with each other using connection 205. Connection 205 can be a physical connection via a bus, or a direct connection into processor 210, such as in a chipset architecture. Connection 205 can also be a virtual connection, networked connection, or logical connection.

In some embodiments, computing system 200 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 200 includes at least one processing unit (CPU or processor) 210 and connection 205 that couples various system components including system memory 215, such as read only memory (ROM) 220 and random access memory (RAM) 225 to processor 210. Computing system 200 can include a cache of high-speed memory 212 connected directly with, in close proximity to, or integrated as part of processor 210.

Processor 210 can include any general purpose processor and a hardware service or software service, such as services 232, 234, and 236 stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

To enable user interaction, computing system 200 includes an input device 245, which can represent any number of input mechanisms, such as a microphone for speech, a touch-sensitive screen for gesture or graphical input, keyboard, mouse, motion input, speech, etc. Computing system 200 can also include output device 235, which can be one or more of a number of output mechanisms known to those of skill in the art. In some instances, multimodal systems can enable a user to provide multiple types of input/output to communicate with computing system 200. Computing system 200 can include communications interface 240, which can generally govern and manage the user input and system output. There is no restriction on operating on any particular hardware arrangement and therefore the basic features here may easily be substituted for improved hardware or firmware arrangements as they are developed.

Storage device 230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 230 can include software services, servers, services, etc., that when the code that defines such software is executed by the processor 210, it causes the system to perform a function. In some embodiments, a hardware service that performs a particular function can include the software component stored in a computer-readable medium in connection with the necessary hardware components, such as processor 210, connection 205, output device 235, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, by a portable computing device and via at least one input device of the portable computing device, a password or biometric, and unlocking, by the portable computing device, in response to the receipt of the password or the biometric;
accessing, by the portable computing device, a wallet application including a user account associated with the portable computing device stored on the portable computing device;
sending, by the portable computing device, a card request order over a network to a server, the card request order including a user identifier (ID) and a user address;
detecting, by the portable computing device, presence of an un-activated card, and reading, by the portable computing device and via a NFC reader of the portable computing device or a camera of the portable computing device, an NFC tag or optical pattern on the un-activated card, the NFC tag or the optical pattern containing encoded information including a card identifier (ID), an activation code and an electronic address at the server;
automatically sending, by the portable computing device over the network to the electronic address at the server, an activation request to activate the un-activated card, the activation request including a device identifier (ID) or model description, the card ID and the activation code; and
receiving, by the portable computing device over the network from the server an activation notification that the un-activated card has been activated when the device ID or the model description match the portable computing device associated with the user account.

2. The method of claim 1, wherein the step of receiving, by the portable computing device over the network from the server, a notification that the un-activated card has been activated is further conditioned on when the server has also received a notification that the card was shipped or delivered.

3. The method of claim 1, further comprising:
prior to the reading, by the portable computing device, the NFC tag or optical pattern on the un-activated card, receiving, by the portable computing device, a notification that the un-activated card has been shipped or delivered, and
storing, by the portable computing device, data indicating that the un-activated card is expected.

4. The method of claim 1 further comprising receiving by the portable computing device, an action based on activation instructions for a version of the portable computing device on a card holder associated with the un-activated card.

5. The method of claim 1, wherein the un-activated card is an NFC card.

6. The method of claim 5, wherein the activation code is the NFC tag ID.

7. The method of claim 1, wherein the electronic address is an activation URL, and the activation request is electronically sent through use of the activation URL.

8. A portable computing device comprising:
at least one processor;
at least one input device;
at least one of an NFC reader and a camera;
a memory including a wallet application with an account associated with the portable computing device; and
at least one non-transitory computer-readable medium storing instructions that, when executed by the at least one processor, cause the at least one processor to:
receive, via the at least one input device, a password or biometric, and unlock in response to the receipt of the password or the biometric;
access a wallet application including a user account associated with the portable computing device stored on the portable computing device;
send a card request order over a network to a server, the card request order including a user identifier (ID) and a user address;
detect presence of an un-activated card, and read, via the NFC reader or the camera, an NFC tag or optical pattern on the un-activated card, the NFC tag or the optical pattern containing encoded information including a card identifier (ID), an activation code and an electronic address at the server;
automatically send, over the network to the electronic address at the server, an activation request to activate the un-activated card, the activation request including a device identifier (ID) or model description, the card ID and the activation code; and
receive, over the network from the server, an activation notification that the un-activated card has been activated when the device ID or the model description match the portable computing device associated with the user account.

9. The portable computing device of claim 8, further comprising a user interface, and wherein the memory further stores instructions, that when executed by the at least one processor, further causes the at least one processor to:

prior to the reading the NFC tag or the optical pattern on the un-activated card, receive a request for the un-activated card in the user interface.

10. The portable computing device of claim 8, wherein the memory further stores instructions, that when executed by the at least one processor, further causes the at least one processor to:

prior to the reading of the NFC tag or the optical pattern on the un-activated card, receive a notification that the un-activated card has been shipped or delivered; and store data indicating that the un-activated card is expected.

11. The portable computing device of claim 10, the at least one non-transitory computer-readable medium further storing instructions that, when executed by the at least one processor, further cause the at least one processor to send the activation request only after receiving the notification that the un-activated card has been shipped or received.

12. The portable computing device of claim 8, wherein the un-activated card is an NFC card.

13. The portable computing device of claim 12, wherein the activation code is the NFC tag ID.

14. A non-transitory computer readable medium storing instructions, that when executed by at least one processor of a portable computing device, causes the at least one processor of the portable computing device to perform operations comprising:

receiving, via at least one input device of the portable computing device, a password or biometric, and unlocking in response to the receipt of the password or the biometric;

accessing a wallet application including a user account associated with the portable computing device stored on the portable computing device;

sending a card request order over a network to a server, the card request order including a user identifier (ID) and a user address;

detecting presence of an un-activated card, and reading, via a NFC reader of the portable computing device or a camera of the portable computing device, an NFC tag or optical pattern on the un-activated card, the NFC tag or the optical pattern containing encoded information including a card identifier (ID), an activation code and an electronic address at the server;

automatically sending, over the network to the electronic address at the server, an activation request to activate the un-activated card, the activation request including a device identifier (ID) or model description, the card ID and the activation code;

and receiving, over the network from the server, an activation notification that the un-activated card has been activated when the device ID or the model description match the portable computing device associated with the user account.

15. The non-transitory computer readable medium of claim 14 wherein receiving, over the network from the server, a notification that the un-activated card has been activated is further conditioned on when the server has also received a notification that the card was shipped or delivered.

16. The non-transitory computer readable medium of claim 14, further comprising instructions, that when executed by the at least one processor of the portable computing device, causes the at least one processor of the portable computing device to perform operations comprising:

prior to the reading the NFC tag or optical pattern of on the un-activated card, receiving a notification that the un-activated card has been shipped or delivered, and storing data indicating that the un-activated card is expected.

17. The non-transitory computer readable medium of claim 14 further comprising instructions, that when executed by the at least one processor of the portable computing device, causes the at least one processor of the portable computing device to perform operations comprising:

receiving an action based on activation instructions for a version of the portable computing device on a card holder associated with the un-activated card.

18. The non-transitory computer readable medium of claim 14, wherein the un-activated card is an NFC card.

19. The non-transitory computer readable medium of claim 14, wherein the activation code is the NFC tag ID.

20. The non-transitory computer readable medium of claim 14, wherein the electronic address is an activation URL, and wherein automatically sending, over the network to the electronic address at the server, the activation request causes the activation request to be electronically sent through use of the activation URL.

\* \* \* \* \*

UNITED STATES PATENT AND TRADEMARK OFFICE
CERTIFICATE OF CORRECTION

PATENT NO. : 11,392,935 B2
APPLICATION NO. : 16/944885
DATED : July 19, 2022
INVENTOR(S) : Suresh et al.

It is certified that error appears in the above-identified patent and that said Letters Patent is hereby corrected as shown below:

In the Claims

Column 12, Line 26: In Claim 16, replace "of on" with --on--

Signed and Sealed this
Sixth Day of September, 2022

Katherine Kelly Vidal
*Director of the United States Patent and Trademark Office*